US009799103B2

(12) United States Patent
Zhang (10) Patent No.: US 9,799,103 B2
(45) Date of Patent: Oct. 24, 2017

(54) IMAGE PROCESSING METHOD, NON-TRANSITORY COMPUTER-READABLE STORAGE MEDIUM AND ELECTRICAL DEVICE

(71) Applicant: ASUSTeK COMPUTER INC., Taipei (TW)

(72) Inventor: Zhe-Hao Zhang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/256,878

(22) Filed: Sep. 6, 2016

(65) Prior Publication Data

US 2017/0076432 A1    Mar. 16, 2017

Related U.S. Application Data

(60) Provisional application No. 62/217,979, filed on Sep. 14, 2015.

(30) Foreign Application Priority Data

Jun. 7, 2016    (TW) .............................. 105118045 A (51) Int. Cl.
*G06T 5/00*    (2006.01)
*G06F 3/0484*    (2013.01)

(52) U.S. Cl.
CPC .......... *G06T 5/002* (2013.01); *G06F 3/04845* (2013.01); *G06T 2207/20092* (2013.01)

(58) Field of Classification Search
None
See application file for complete search history.

(56) References Cited

U.S. PATENT DOCUMENTS

| | | | |
|---|---|---|---|
| 9,041,727 B2 | 5/2015 | Ubillos et al. | |
| 2003/0071905 A1 | 4/2003 | Yamasaki | |
| 2009/0207138 A1* | 8/2009 | Thorn | G06F 3/04883 345/173 |
| 2011/0102457 A1 | 5/2011 | Bhatt et al. | |
| 2012/0013640 A1 | 1/2012 | Chen | |

(Continued)

FOREIGN PATENT DOCUMENTS

| | | |
|---|---|---|
| CN | 103139478 | 6/2013 |
| CN | 103186341 A | 7/2013 |
| CN | 103257811 A | 8/2013 |

(Continued)

OTHER PUBLICATIONS

Office Action issued in corresponding Taiwan patent application dated Nov. 29, 2016.

*Primary Examiner* — Bernard Krasnic
(74) *Attorney, Agent, or Firm* — McClure, Qualey & Rodack, LLP (57) ABSTRACT

An image processing method is applied to an electrical device. The image processing method includes the following steps: reading a first image; defining a motion blur center-point on the first image; receiving a dragging track executed on the first image; and executing a motion blur process according to the motion blur center-point and the dragging track to generate a second image. A motion blur level and a motion blur type of the second image are determined according to a related parameter between the dragging track and the motion blur center-point.

14 Claims, 5 Drawing Sheets

(56) References Cited

U.S. PATENT DOCUMENTS

2012/0314908 A1* 12/2012 Hirasawa ................ G06T 5/002
                                                              382/106
2013/0235071 A1*  9/2013 Ubillos ................. G06F 3/0484
                                                              345/600

FOREIGN PATENT DOCUMENTS

| CN | 103745430 | 4/2014 |
| CN | 104200459 | 12/2014 |
| CN | 104247390 | 12/2014 |
| CN | 104700442 | 6/2015 |
| TW | 201203113 | 1/2012 |

* cited by examiner

IMAGE PROCESSING METHOD, NON-TRANSITORY COMPUTER-READABLE STORAGE MEDIUM AND ELECTRICAL DEVICE

CROSS-REFERENCE TO RELATED APPLICATION

This application claims the priority benefit of U.S. provisional application Ser. No. 62/217,979, filed on Sep. 14, 2015 and TW application serial No. 105118045, filed on Jun. 7, 2016. The entirety of the above-mentioned patent applications are hereby incorporated by reference herein and made a part of specification.

BACKGROUND OF THE INVENTION

Field of the Invention

The invention relates to a material and an image processing method and, more particularly, to an image processing method of a motion blur process.

Description of the Related Art

As the technology develops, the smart phone and the mobile network are widely used. People usually edit images by editing software first and then shared them on the social network. However, the edited effect on the images only shows after all parameters are set. Users cannot view the effect while setting parameters.

BRIEF SUMMARY OF THE INVENTION

According to first aspect of the disclosure, an image processing method, applied to an electrical device, wherein the image processing method includes: reading a first image; defining a motion blur center-point on the first image; receiving a dragging track executed on the first image; and executing a motion blur process according to the motion blur center-point and the dragging track to generate a second image, wherein a motion blur level and a motion blur type of the second image are determined according to a related parameter between the dragging track and the motion blur center-point in the motion blur process.

According to second aspect of the disclosure, a non-transitory computer-readable storage medium, wherein the non-transitory computer-readable storage medium stores a computer program, the computer program is loaded to an electrical device to execute an image processing method, and the image processing method includes: reading a first image; defining a motion blur center-point on the first image; receiving a dragging track executed on the first image; and executing a motion blur process on the first image according to the motion blur center-point and the dragging track to generate a second image, wherein a motion blur level and a motion blur type of the second image are determined according to a related parameter between the dragging track and the motion blur center-point in the motion blur process.

According to second aspect of the disclosure, an electrical device, comprises: an input module, receiving a dragging track; an image processing module, reading a first image, defining a motion blur center-point on the first image and executing a motion blur process according to the motion blur center-point and the dragging track to generate a second image, wherein a motion blur level and a motion blur type of the second image are determined according to a related parameter between the dragging track and the motion blur center-point in the motion blur process; and a display module, displaying the second image.

In sum, in the embodiment, the motion blur type and the motion blur level of the motion blur process are determined according to the dragging track, and then the user operates the same user interface to generate the image with different motion blur effects.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
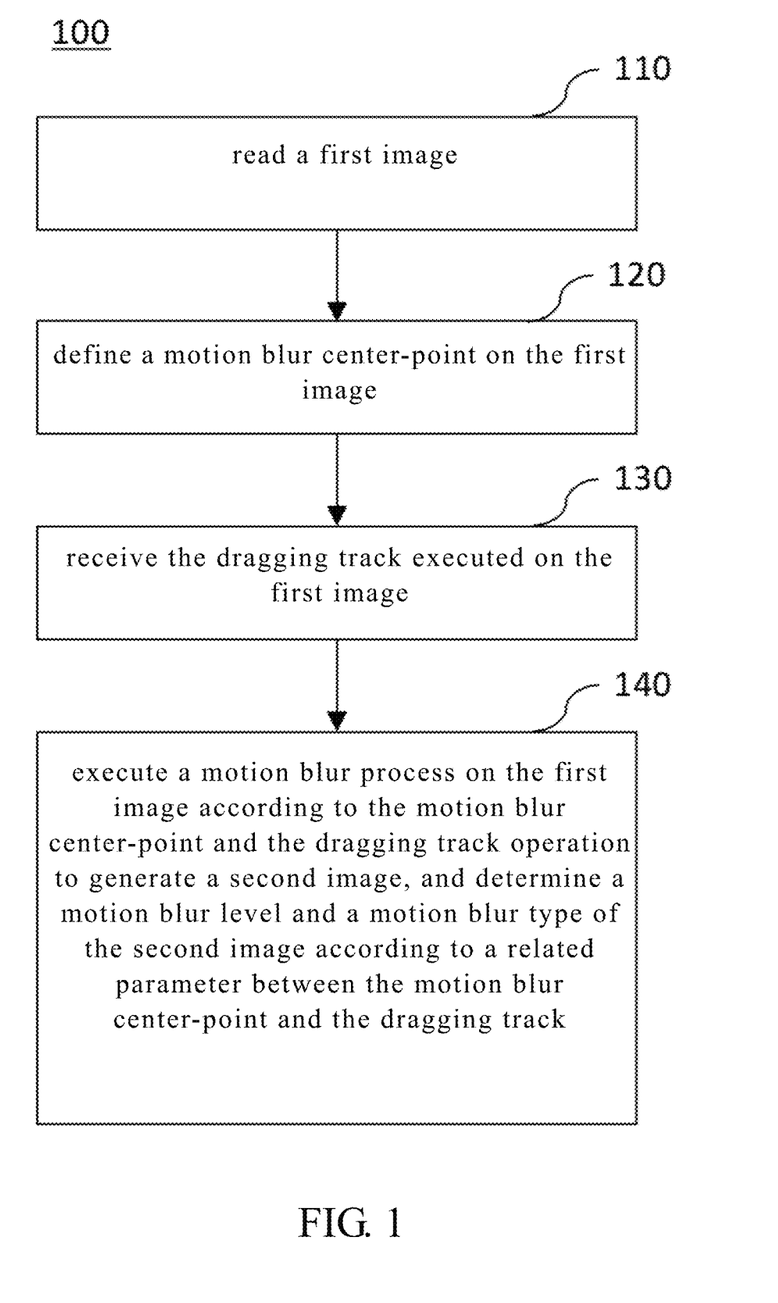
FIG. 1 is a flow diagram showing an image processing method in an embodiment.
Figure 2:
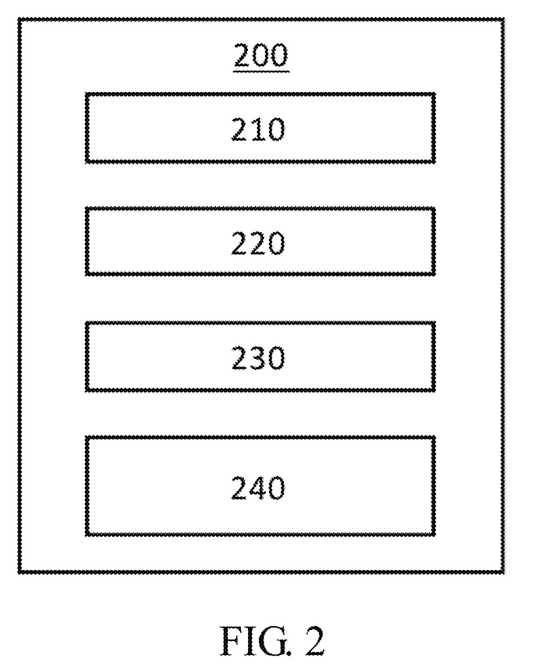
FIG. 2 is a schematic diagram showing an electrical device in an embodiment.

Please refer to FIG. 1 and FIG. 2. FIG. 1 is a flow diagram showing an image processing method 100 in an embodiment. FIG. 2 is a schematic diagram showing an electrical device 200 in an embodiment. The image processing method 100 is applied to the electrical device 200. The electrical device 200 includes an input module 210, an image processing module 220, a display module 230 and a non-transitory computer-readable storage medium 240. The electrical device 200 is an electrical device with an image processing function, such as a mobile phone, a tablet computer, a laptop computer, which is not limited herein. The input module 210 is a sensor module of a touch screen or a mouse, which is not limited herein. The image processing module 220 is a processor having an image processing function, such as a system on chip (SOC), which is not limited herein. The display module 230 is a screen, or a micro projector, which is not limited herein. The non-transitory computer-readable storage medium 240 is a read-only memory, a flash memory, a hard disk, which is not limited herein. The non-transitory computer-readable storage medium 240 stores a computer program, and the image processing module 220 of the electrical device 200 executes the image processing method 100. The non-transitory computer-readable storage medium 240 stores image files (such as a first image 300 hereinafter) to be processed by an image process. The steps of the image processing method 100 become better understood with regard to the following embodiments and accompanying drawings.

Figure 3:
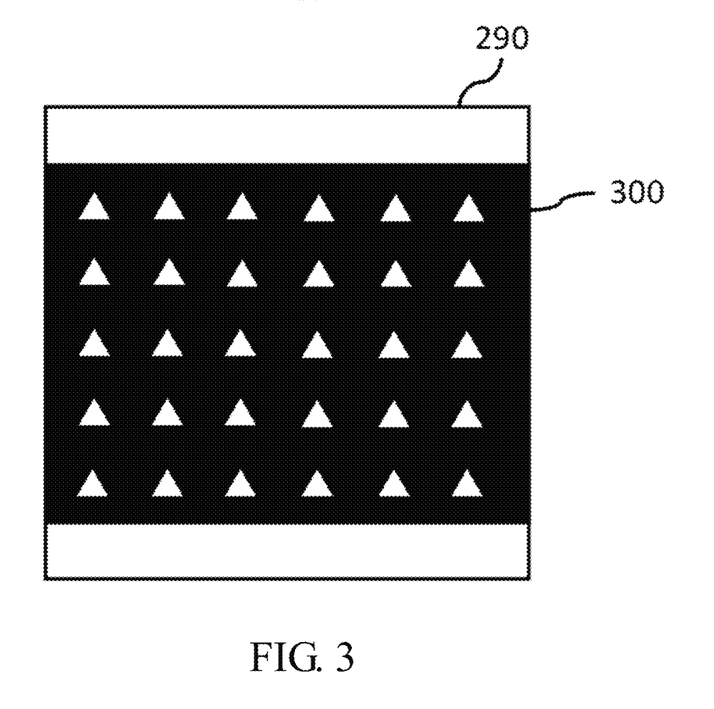
FIG. 3 is a schematic diagram showing a first image in an embodiment.

Please refer to FIG. 1. In step 110, the image processing module 220 reads the first image 300 that stored in the non-transitory computer-readable storage medium 240. Please refer to FIG. 3. FIG. 3 is a schematic diagram showing the first image 300 in an embodiment. As shown in FIG. 3, the display module 230 displays a user interface 290.

After the first image 300 is read, the display module 230 displays the first image 300 on the user interface 290. In an embodiment, the first image 300 includes a black background and a plurality of triangular color blocks arranged on the black background, which is used to illustrate different motion blur processes, and the pattern of the first image 300 is not limited herein.

Figure 4:
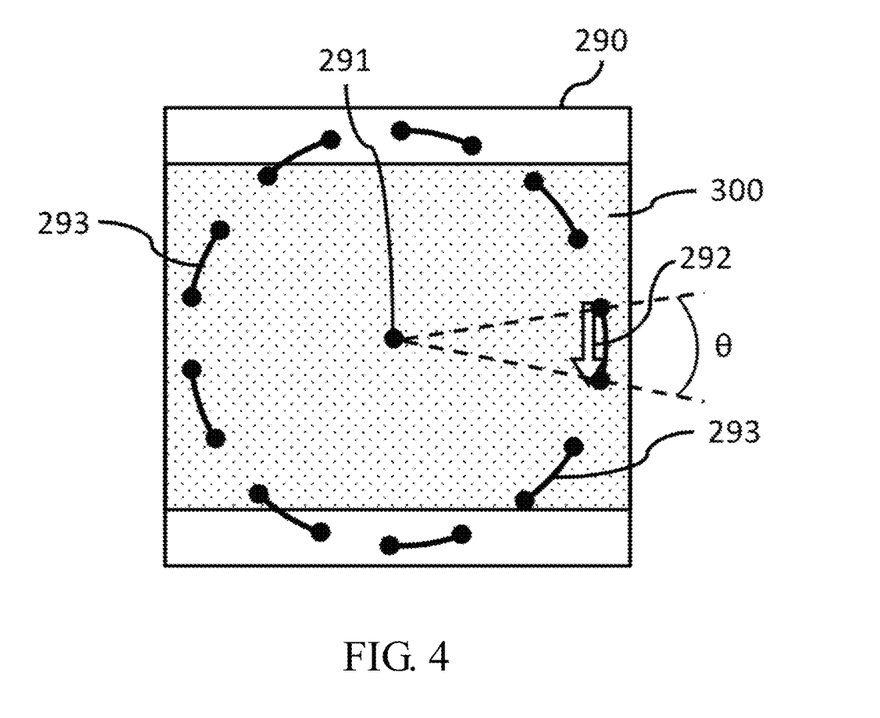
FIG. 4 is a schematic diagram showing a user interface in a first embodiment.

In step 120 and as shown in FIG. 4, a motion blur center-point 291 is defined in the first image 300. In an embodiment, the motion blur center-point 291 is defaulted at the center of the first image 300. In an embodiment, a position of the motion blur center-point 291 is defined through the user interface 290. For example, the user interface 290 displays a pattern (such as a dot) which represents the motion blur center-point 291 when a tap event is performed on the touch screen. The pattern can be dragged to a desired position, and the image processing module 220 records a coordinate of the desired position when the tap event is performed again on the touch screen. Then, the pattern of the motion blur center-point 291 displayed on the user interface 290 disappears, which indicates that the following steps can be further executed.

Please refer to FIG. 4. FIG. 4 is a schematic diagram showing the user interface 290 in a first embodiment. When an initial screen (the first image 300 is displayed at the user interface 290) as shown in FIG. 3, the input module 210 is ready to be operated. The user interface 290 receives an operation alone a dragging track 292 on the first image 300 (step 130). In an embodiment, a white arrow is further displayed to indicate the dragging track 292. In an embodiment, no indication pattern is displayed on the user interface 290.

Similarly, in an embodiment, the pattern of the motion blur center-point 291 is also not displayed when the dragging track 292 is formed. The trailing end of the dragging track 292 represents a starting point of the dragging track 292. The arrowhead of the dragging track 292 represents an end point of the dragging track 292. In the embodiment, the input module 210 is also the sensor module of the touch screen, the first touch position of the dragging track 292 on the touch screen is the start point of the dragging track 292. In the embodiment, when the finger touches the surface of the touch screen and continuously moves, a moving path of the finger detected by the input module 210 forms the dragging track 292. In the embodiment, a second position where the finger leaves from the touch screen is the end point of the dragging track 292.

In an embodiment, the input module 210 is a mouse, when the left button of the mouse is first clicked, a first position of the cursor on the user interface 290 is the starting point of the dragging track 292. When the left button of the mouse is pressed continuously and the mouse is moved, the dragging track 292 is formed. A second position of the cursor is the end point of the dragging track 292 where the left button is released. In an embodiment, in order to avoid missing operation and simply the calculation of the image processing method, a connecting line between an initial input position and a current input position is regarded as the dragging track 292 (in the embodiment with fingers, a current finger touch position is regarded as the current input position and an initial finger touch position is regarded as the initial input position).

Figure 7:
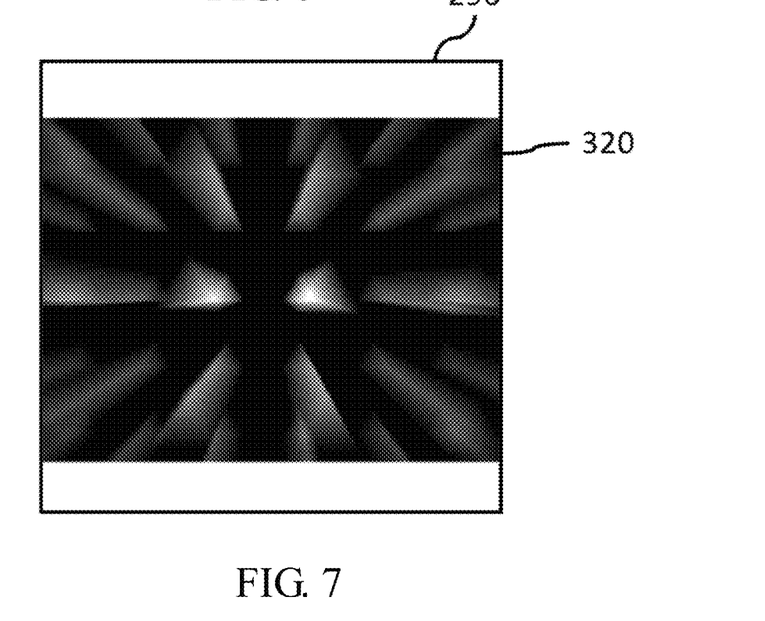
FIG. 7 is a schematic diagram showing a second image in a second embodiment.
Figure 9:
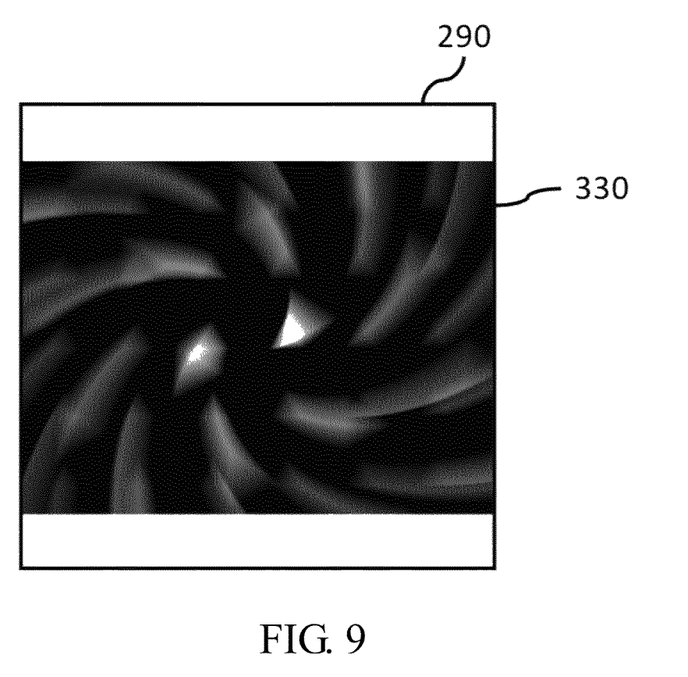
FIG. 9 is a schematic diagram showing a second image in a third embodiment.

In step 140, a motion blur process is executed on the first image 300 according to the motion blur center-point 291 and the dragging track 292 to generate a second image 310. In the motion blur process, a motion blur level and a motion blur type of the second image 310 are determined according to at least a related parameter between the motion blur center-point 291 and the dragging track 292. The motion blur type is a twisting blur (as shown in FIG. 5), a radial blur (as shown in FIG. 7) or a swirling blur (as shown in FIG. 9) in embodiments, which is not limited herein.

Figure 5:
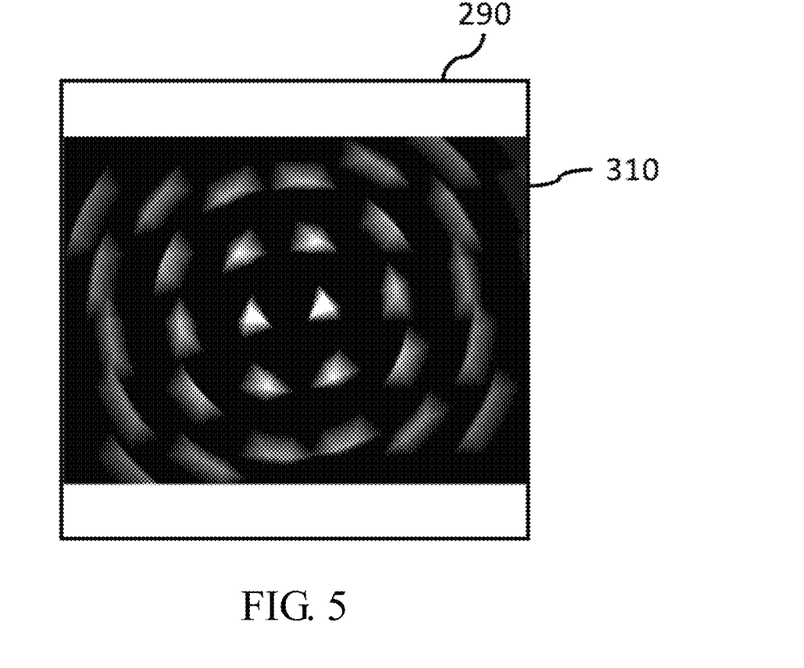
FIG. 5 is a schematic diagram showing a second image in a first embodiment.

Please refer to FIG. 4 and FIG. 5. FIG. 5 is a schematic diagram showing the second image 310 in a first embodiment. In the embodiment, the related parameter includes a dragging direction of the dragging track 292. The image processing module 220 recognizes the dragging direction (the direction from the starting point to the end point) of the dragging track 292, for example, the dragging direction is toward the motion blur center-point 291, away from the motion blur center-point 291, or a tangential direction of a circle with the motion blur center-point 291 at the center. As shown in FIG. 4, the dragging direction of the dragging track 292 is the tangential direction of a circle with the motion blur center-point 291 at the center.

The motion blur type of the motion blur process is determined according to the recognized dragging direction. If the direction of the dragging track 292 is the tangential of the circle with the motion blur center-point 291 at the center, or towards the motion blur center-point 291, the image processing module 220 determines the motion blur type of the motion blur process is the twisting blur. If the dragging direction of the dragging track 292 is away from the motion blur center-point 291, the motion blur type of the motion blur process is determined as the radial blur or the swirling blur. In the process of the twisting blur, each pixel of the first image 300 moves by an arc with the motion blur center-point 291 at the center of a circle, with radius which equals to a distance between each pixel and the motion blur center-point 291. The moving direction is same with the direction of the dragging track 292 (both are clockwise or both are counterclockwise), which is not limited herein.

In the embodiment of the twisting blur above, a length of the arc (or named a length of motion blur track) affects the motion blur level of the motion blur process. If the length of motion blur track is long, the motion blur level of the second image 310 is high; otherwise, if the length of motion blur track is short, the second image 310 is less blur (the motion blur level is low). In other words, the motion blur level of the motion blur process is determined by the length of motion blur track. In the motion blur process, the motion blur level of the motion blur process is determined according to at least one related parameter between the motion blur center-point 291 and the dragging track 292. In the embodiment, the related parameter is an angle θ. In the motion blur process, the image processing module 220 determines the length of motion blur track of the motion blur level according to the angle θ between a line from the motion blur center-point 291 to the starting point of the dragging track 292 and a line from the motion blur center-point 291 to the end point of the dragging track operation 292. If the angle θ is big, the length of motion blur track is long; otherwise, if the angle θ is small, the length of motion blur track is short. In the embodiment, the angle θ is an acute angle.

In an embodiment, the related parameter is a length of the dragging track 292. The image processing module 220 determines the motion blur level of the motion blur process according to the length of the dragging track 292. If the dragging track 292 is long, the length of motion blur track is long; otherwise, if the length of the dragging track 292 is short, the length of motion blur track is short.

In an embodiment, the related parameter is a starting point position of the dragging track 292. The image processing module 220 determines the motion blur level of the motion blur process according to a distance between the starting point position of the dragging track 292 and the motion blur center-point 291. If the distance is long, the length of motion blur track is long; otherwise, if the distance is short, the length of motion blur track is short.

In an embodiment, the image processing module 220 determines the motion blur level of the motion blur process according to other parameters. In an embodiment, the length of motion blur track is determined according to a distance between each pixel of the first image 300 and the motion blur center-point 291. If a distance between the pixel and the motion blur center-point 291 is short, the length of motion blur track is short; if a distance between the pixel and the motion blur center-point 291 is long, the length of motion blur track is long. Consequently, in contrast, the pixel close to the motion blur center-point 291 is much clear, and the pixel far from the motion blur center-point 291 is more blurred.

In an embodiment, the image processing module 220 determines the length of motion blur track which indicates the motion blur level according to more than two of the relation parameters and other parameters. For example, in the second image 310 as shown in FIG. 5, the length of motion blur track corresponding to the motion blur level is determined according to a distance between each pixel of the first image 300 and the motion blur center-point 291, the starting point position of the dragging track 292 and the angle θ as described above. A better motion blur effect is obtained by setting parameters with different weights.

After the second image 310 is generated, the display module 230 displays the second image processed via the motion blur process.

Figure 6:
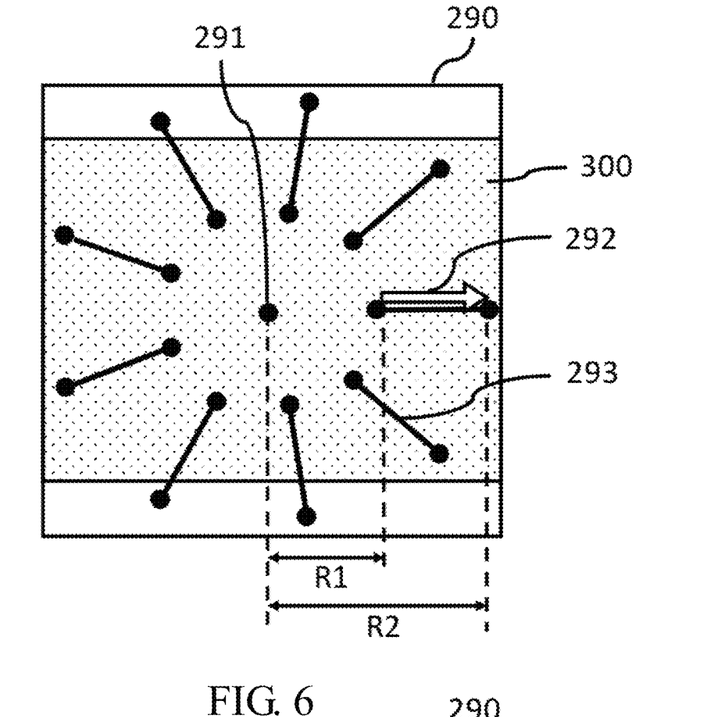
FIG. 6 is a schematic diagram showing a user interface in a second embodiment.

Please refer to FIG. 6 and FIG. 7. FIG. 6 and FIG. 7 are schematic diagrams showing the user interface 290 and the second image 320 in a second embodiment. In the embodiment, according to the step 140, the image processing module 220 recognizes that the dragging direction of the dragging track 292 is away from the motion blur center-point 291. Further, the image processing module 220 gets other related parameters between the motion blur center-point 291 and the dragging track 292. In the embodiment, the related parameter is an angle θ between the line from the motion blur center-point 291 to the starting point of the dragging track 292 and the line from the motion blur center-point 291 to the end point of the dragging track 292. In the embodiment, the angle θ is zero (that manes the motion blur center-point 291, the starting point and the end point of the dragging track 292 locate in a straight line), which is not shown.

According to the dragging direction of the dragging track 292 is away from the motion blur center-point 291 and the angle θ is zero, the image processing module 220 determines the motion blur type of the motion blur process is the radial blur. In the motion radial blur process, each pixel of the first image 300 moves a distance in a straight line towards the direction away from the motion blur center-point 291. The image processing module 220 determines the distance (the length of motion blur track) according to a relationship between a first distance R1 and a second distance R2. The first distance R1 is from the motion blur center-point 291 to the starting point of the dragging track 292. The second distance R2 is from the motion blur center-point 291 to the end point of the dragging track 292. The relationship is a ratio of the first distance R1 to the second distance R2, or a difference value between the first distance R1 and the second distance R2. Consequently, the starting point position of the dragging track 292 and the length of the dragging track 292 affect the motion blur level (the length of motion blur track). In the embodiment, another related parameter is the angle θ. The image processing module 220 determines the radian of the moving path (the radian of motion blur track) of each pixel of the first image 300 according to the angle θ. In the second embodiment, the angle θ is zero, and thus the radian is zero, and then each pixel moves in the radial directions away from the motion blur center-point 291.

As shown in FIG. 7, the image processing module 220 combines the related parameters of the length of motion blur track and the radian of motion blur track, as well as the distance between each pixel of the first image 300 and the motion blur center-point 291 to determine the length of motion blur track of each pixel. The parameters are set to have different weights respectively to get a better motion blur effect.

Figure 8:
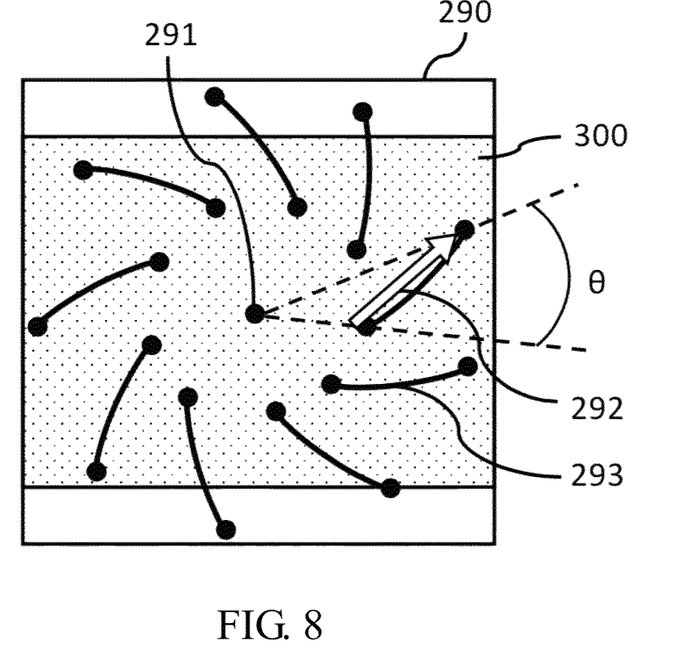
FIG. 8 is a schematic diagram showing a user interface in a third embodiment.

Please refer to FIG. 8 and FIG. 9. FIG. 8 and FIG. 9 schematic diagrams showing the user interface 290 and the second image 330 in a third embodiment. In the embodiment, according to the step 140, the image processing module 220 recognizes that the dragging track 292 towards a direction away from the motion blur center-point 291. Further, the image processing module 220 recognizes that the angle θ is not zero. Then the motion blur type of the motion blur process is determined to be the swirling blur. In the swirling blur process, each pixel of the first image 300 moves away from the motion blur center-point 291. Each pixel moves towards a direction offset by an angle. Therefore the moving path is in an arc shape. The length of the arc is determined according to a relative relationship between a first distance R1 and a second distance R2. The first distance R1 is from the motion blur center-point 291 to the starting point of the dragging track 292. The second distance R2 is from the motion blur center-point 291 to the end point of the dragging track 292. The radian of the arc (the radian of the motion blur track) is determined according to the angle θ. If the angle θ is big, the radian of motion blur track is big; if the angle θ is small, the radian of motion blur track is small.

As shown in FIG. 9, the image processing module 220 determines the length of motion blur track of each pixel according to the related parameter (such as the length of motion blur track and the radian of motion blur track) and the distance between each pixel of the first image 300 and the motion blur center-point 291. A better motion blur effect can be obtained by setting the parameters with different weights.

In an embodiment, as shown in FIG. 4, FIG. 6 and FIG. 8, in receiving the dragging track, the display module 230 displays the motion blur level pattern 293 on the user interface 290. The motion blur level pattern 293 includes a plurality of lines corresponding to the motion blur type and the motion blur level. In detail, in the motion twisting blur type, the motion blur level pattern 293 is a plurality of arcs whose center is the motion blur center-point 291. If the length of the arc is long, the motion blur level is high; otherwise, if the length of the arc is short, the motion blur level is low. In the motion radial blur type, the motion blur level pattern 293 is a plurality of lines arranged in a radial direction away from the motion blur center-point 291. If the length of the lines is long, the motion blur level is high; otherwise, the length of the lines is short, the motion blur level is low. In the motion swirling blur type, the motion blur level pattern 293 is a plurality of arc that arranged in a swirl. The center of the starting points of the arcs is the motion blur center-point 291. The longer the arc length is, the higher the motion blur level is; otherwise, the shorter the arc length is, the lower the motion blur level is. In the embodiment, to show better visual impact, the two ends of the lines (arcs) are shown in a dot, respectively, which is not limited herein.

In sum, in the embodiment, the motion blur type and the motion blur level of the motion blur process are determined according to the dragging track. The image with different motion blur effects is obtained via the operations on the same user interface. Further, during the dragging operation, the motion blur effect is directly shown on the user interface via the motion blur level pattern.

Although the invention has been disclosed with reference to certain preferred embodiments thereof, the disclosure is not for limiting the scope. Persons having ordinary skill in the art may make various modifications and changes without departing from the scope of the invention. Therefore, the scope of the appended claims should not be limited to the description of the preferred embodiments described above.

What is claimed is:

1. An image processing method, applied to an electrical device, wherein the image processing method includes:
   reading a first image;
   defining a motion blur center-point on the first image;
   receiving a dragging track executed on the first image; and
   executing a motion blur process on the first image according to the motion blur center-point and the dragging track to generate a second image,
   wherein a motion blur level and a motion blur type of the second image are determined according to a parameter between the dragging track and the motion blur center-point in the motion blur process, and
   wherein the parameter is an angle between a line from the motion blur center-point to a starting point of the dragging track and a line from the motion blur center-point to an end point of the dragging track, a radian or a length of motion blur track of the motion blur level is determined according to the angle.

2. The image processing method according to claim 1, wherein the parameter between the motion blur center-point and the dragging track includes a dragging direction of the dragging track, in the motion blur process, a motion blur type is determined according to whether the dragging direction is toward the motion blur center-point, away from the motion blur center-point, or toward a tangential direction whose center is the motion blur center-point.

3. The image processing method according to claim 1, wherein the parameter is a relative relationship between a first distance and a second distance, the first distance is from the motion blur center-point to a starting point of the dragging track, and the second distance is from the motion blur center-point to an end point of the dragging track, and a length of motion blur track of the motion blur level is determined according to the relative relationship.

4. The image processing method according to claim 1, further including:
   displaying a motion blur level pattern during receiving the dragging track, wherein the motion blur level pattern includes a plurality of lines corresponding to the motion blur type and the motion blur level.

5. The image processing method according to claim 1, wherein the motion blur type is a twisting blur, a radial blur or a swirling blur.

6. A non-transitory computer-readable storage medium, wherein the non-transitory computer-readable storage medium stores a computer program, the computer program is loaded to an electrical device to execute an image processing method, and the image processing method including:
   reading a first image;
   defining a motion blur center-point on the first image;
   receiving a dragging track executed on the first image; and
   executing a motion blur process on the first image according to the motion blur center-point and the dragging track to generate a second image,
   wherein a motion blur level and a motion blur type of the second image are determined according to a parameter between the dragging track and the motion blur center-point in the motion blur process, and
   wherein the parameter is an angle between a line from the motion blur center-point to a starting point of the dragging track and a line from the motion blur center-point to an end point of the dragging track, a radian or a length of motion blur track of the motion blur level is determined according to the angle.

7. The non-transitory computer-readable storage medium according to claim 6, wherein the parameter includes a dragging direction of the dragging track, in the motion blur process, a motion blur type is determined according to whether the dragging direction is toward the motion blur center-point, away from the motion blur center-point, or a tangential direction whose center is the motion blur center-point.

8. The non-transitory computer-readable storage medium according to claim 6, wherein the parameter is a relative relationship between a first distance and a second distance, the first distance is from the motion blur center-point to a starting point of the dragging track, the second distance is from the motion blur center-point to an end point of the dragging track, and a length of motion blur track of the motion blur level is determined according to the relative relationship.

9. The non-transitory computer-readable storage medium according to claim 6, further including:
   displaying a motion blur level pattern during receiving the dragging track, wherein the motion blur level pattern includes a plurality of lines corresponding to the motion blur type and the motion blur level.

10. The non-transitory computer-readable storage medium according to claim 6, wherein the motion blur type is a twisting blur, a radial blur or a swirling blur.

11. An electrical device, comprising:
    an input module, receiving a dragging track;
    an image processing module, reading a first image, defining a motion blur center-point on the first image and executing a motion blur process on the first image according to the motion blur center-point and the dragging track to generate a second image, wherein a motion blur level and a motion blur type of the second image are determined according to a parameter between the dragging track and the motion blur center-point in the motion blur process and wherein the receiving the dragging track is executed on the first image; and
    a display module, displaying the second image, and
    wherein the parameter is an angle between a line from the motion blur center-point to a starting point of the dragging track and a line from the motion blur center-point to an end point of the dragging track, a radian or a length of motion blur track of the motion blur level is determined according to the angle.

12. The electrical device according to claim 11 wherein the parameter between the motion blur center-point and the dragging track includes a dragging direction of the dragging track, in the motion blur process, a motion blur type is determined according to whether the dragging direction is toward the motion blur center-point, away from the motion blur center-point, or toward a tangential direction whose center is the motion blur center-point.

13. The electrical device according to claim 11, wherein the parameter is a relative relationship between a first distance and a second distance, the first distance is from the motion blur center-point to a starting point of the dragging track, and the second distance is from the motion blur center-point to an end point of the dragging track, and a length of motion blur track of the motion blur level is determined according to the relative relationship.

14. The electrical device according to claim 11, wherein the display module displays a motion blur level pattern during receiving the dragging track, wherein the motion blur level pattern includes a plurality of lines corresponding to the motion blur type and the motion blur level.

* * * * *